United States Patent [19]

Rozelle

[11] Patent Number: 4,907,456
[45] Date of Patent: Mar. 13, 1990

[54] SENSOR PROBE SYSTEM

[75] Inventor: Paul F. Rozelle, Fern Park, Fla.

[73] Assignee: Westinghouse Electric Corp., Pittsburgh, Pa.

[21] Appl. No.: 172,614

[22] Filed: Mar. 24, 1988

[51] Int. Cl.[4] .......................................... G01H 11/00
[52] U.S. Cl. .................................. 73/660; 73/866.5
[58] Field of Search ...................... 73/660, 661, 866.5; 415/118, 119

[56] References Cited

U.S. PATENT DOCUMENTS

| | | | |
|---|---|---|---|
| 2,810,880 | 10/1957 | Buccicone | 324/32 |
| 3,397,586 | 8/1968 | Crook | 74/96 |
| 3,456,184 | 7/1969 | Kopczynski | 324/34 |
| 3,600,957 | 8/1971 | Stoffel | 74/87 |
| 3,765,266 | 10/1973 | Carlise | 74/571 M |
| 3,871,311 | 3/1975 | Ciecior et al. | 112/200 |
| 3,936,217 | 2/1976 | Travaglini et al. | 415/118 |
| 4,018,083 | 4/1977 | Hoffmann | 73/70 |
| 4,063,159 | 12/1977 | Haberlein | 324/260 |
| 4,066,949 | 1/1978 | Condrac | 324/262 |
| 4,096,754 | 6/1978 | Beveridge, Jr. et al. | 73/866.5 |
| 4,367,650 | 1/1983 | Hilgner | 73/649 |
| 4,375,170 | 3/1983 | Sperry, III et al. | 73/866.5 |
| 4,423,635 | 1/1984 | Senicourt et al. | 73/593 |
| 4,495,810 | 1/1985 | Tessarzik et al. | 73/432 R |
| 4,516,425 | 5/1985 | Chollet et al. | 73/866.5 |
| 4,573,358 | 3/1986 | Luongo | 73/660 |
| 4,742,717 | 5/1988 | Ichino | 73/866.5 |

Primary Examiner—Stewart J. Levy
Assistant Examiner—Louis M. Arana
Attorney, Agent, or Firm—D. C. Abeles

[57] ABSTRACT

This invention relates to a method for measuring vibration in turbine blades and to an apparatus for mounting a sensing device for monitoring blade tip vibration in turbo-machinery. A guide tube is mounted through the cylinder covers of a turbine and extends to a position adjacent to the tip of the turbine blades. The guide tube is sealed at the cylinder covers and has a gate valve external of the turbine cylinder covers. A method for measuring vibration and turbine blades while the turbine is in full operation includes the steps of removing a dummy probe partially from the guide tube while the turbine is in operation. With the dummy probe still in a portion of the guide tube, the gate valve is closed. Once the gate valve is closed, the dummy sensor probe is completely removed from the guide tube and a vibration sensor probe is inserted into the guide tube opening, then the gate valve is opened for sliding the vibration sensor probe into the guide tube until a shoulder on the vibration sensor probe is positioned against an alignment shoulder at the end of the guide tube. The vibration sensor then measures vibrations of the turbine blades during the operation of the turbine.

11 Claims, 6 Drawing Sheets

SENSOR PROBE SYSTEM

FIELD OF THE INVENTION

This invention relates in general to turbo-machinery and, more particularly, to an improved mounting apparatus and a method for mounting a sensing device for monitoring blade tip vibration in turbo-machinery.

BACKGROUND OF THE INVENTION

Turbo-machinery, such as steam and gas turbines, include a plurality of blades arranged in rows extending radially from an axially aligned shaft, the rows of blades being rotatable in response to the force of a high pressure fluid flowing axially through the machine. Due to their complex design, the blades have many resonant vibrational frequencies. Blade resonant frequencies which are excited may create stresses sufficient to break the blades and cause extensive damage. Although blades are designed and tested prior to machine installation in order to prevent resonant vibration, such evaluations performed prior to actual use may not subject the blades to the same temperature, pressure, flow, and rotational conditions which are experienced during normal operations. Consequently, it is desirable to monitor rotating blades on-line in order to detect all resonant vibrations. It is also desirable to monitor rotating blades on-line in order to detect new vibration problems which develop after a turbomachine is put in use. Changes in blade vibrations may be indicative of significant structural changes which may also lead to extensive damage as well as costly down time while the machine undergoes repair.

Vibration monitoring systems have been developed for on-line detection of blade vibrations. A typical system employs non-contacting proximity sensors concentrically mounted about individual blade rows. Each sensor is used to detect motion of a rotating blade tip about its normal position in a rotating time frame. Each of the sensors, which may be of the magnetic induction, capacitive, or optical type, develops an electrical output as each blade tip rotates past it. Many vibration monitoring systems measure the time required for a blade tip to travel between two reference points which are separated by a known distance. Deviations between the measured travel time of the blade tip and the expected travel time based on shaft rotational speed are calculated. The deviations are used to reconstruct a time history of vibrational movement for each blade tip. Fourier analysis is then used to determine the amplitudes and frequencies of the vibration present in each blade.

In the past, steam turbines have been shut down and cooled and, for any but the last row of blades, disassembled to provide access to the sensors. A probe installation commonly used on turbines includes using a guide tube sealed at the cylinder penetrations of the turbine and having a gate valve, for measuring the pressure in the flow path of the turbine. Sensors in these cases have been mounted externally of the guide tube and not in close proximity to the rotating blades. In the present invention, a method of probe installation includes a guide tube, gate valve, and seals at the turbine cylinder penetrations. The sensor is mounted in the probe tip rather than externally of the turbine cylinder and is located in a precise spaced relationship with the rotating blade tips of the turbine and is positioned radially by a shoulder near the bottom of the tube. Probes may be accurately positioned while the rotary machine remains in operation.

SUMMARY OF THE INVENTION

This invention relates to an improved mounting apparatus and a method for mounting a sensing device for monitoring blade tip vibration in turbo-machinery. A turbine installation having a rotating shaft with turbine blades extending radially therefrom is mounted in a dual housing and has a probe assembly for measuring vibrations occurring in the turbine blades. The probe assembly includes a guide tube mounted through the housing with a gas-tight seal and a supporting ring mounted adjacent to the turbine blades and having a guide tube supporting bore therein and having a positioning or alignment shoulder formed therein. A gate valve allows the closing of the passageway through the guide tube while changing probes and a sensor probe is shaped to fit into the guide tube against the guide tube shoulder for measuring vibrations while the turbine is in operation. A dummy probe can be fitted into the guide tube to fill the guide tube passageway when the sensor probe is removed. The dummy probe blocks gas from entering the guide tube when the sensor probe is removed.

A method for measuring vibration in turbine blades while the turbine is in operation includes the steps of removing a dummy sensor probe partially from the guide tube while the turbine is in operation and the dummy sensor probe is left partially in the guide tube until the gate valve is closed. Once the gate valve is closed the next step is to remove the dummy sensor probe completely from the guide tube and insert a vibration sensor probe into the end of the guide tube, then open the gate valve and slide the vibration sensor probe all the way into the guide tube until its alignment shoulder abuts a positioning shoulder at the end of the guide tube. Because the positioning shoulder is near the blades, differential expansion and distortion effects on the distance between blades and sensor are minimized. The shoulder also provides a positive stop, so that the sensor and probe can not enter the path of the rotating blades. The vibration in the turbine blades is then measured during operation of the turbine so that vibration in the turbine blades can be measured during full operation of a turbine without interfering with the operation of the turbine by the swapping of a dummy probe with a sensor probe. The dummy probe is locked in position by a threaded cap over the end of the guide tube and has a spring placed between the cap and the dummy probe to hold the dummy probe positioning shoulder against the alignment shoulder in a turbo diaphragm support ring to prevent the ingress or egress of gas through the guide tube during the operation of the turbine.

BRIEF DESCRIPTION OF THE DRAWINGS

Other objects, features, and advantages of the present invention will be apparent from the written description and the drawings in which.

DESCRIPTION OF THE PREFERRED EMBODIMENTS

Figure 1:
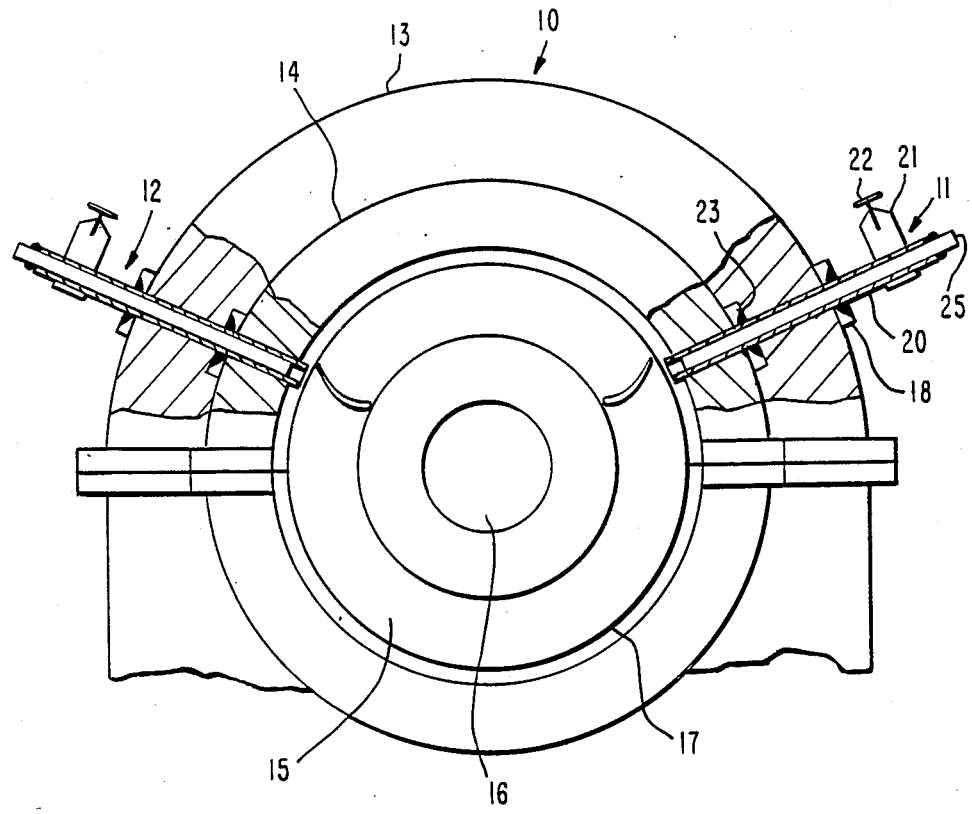
FIG. 1 is a sectional view of sensor probe system mounted in a turbine installation in accordance with the present invention.

Referring to the drawings and especially to FIG. 1, a turbine installation 10 has a two probe blade vibration monitor mounted thereto with a first probe mounting installation 11 and a second probe mounting installation 12. The turbine installation 25 has an outer cylinder cover 13 and an inner cylinder cover 14 covering the turbine blades 15 mounted to a center shaft 16. Each vibration monitor assembly 11 and 12 has a sensor support tube 20 mounted through the outer cylindrical cover 13 and the inner 30 cylindrical cover 14 and through a diaphragm support ring 17 surrounding the rotating blades 15. The central support tube 20 is threaded into a drilled and tapped portion of the diaphragm support ring 17. A gate valve 21 is mounted in the central support tube 11 for closing the passageway through the tube 20 and includes a handle 22 exterior of the outer cylinder cover 13. The central support tube 20 can have a vibration monitor sensor for monitoring vibration in the turbine blades 15 or alternatively may have a dummy sensor probe mounted therein when vibration is not being monitored for the turbine installation 10. Tube 20 has a seal 18 mounted for sealing the passageway through the outer cylinder cover 13 and a packing seal 23 for sealing the passageway through the inner cover 14. Passage of gas through the tube 20 is always blocked during operation of the turbine by either the sensor 25 or a dummy sensor (in FIG. 3) or by the closing of the gate valve 21. The combination of the three ways of blocking the guide tube 20 always allows the blocking of the ingress or egress of gases through the tube 20 when the turbine is operating while allowing the changing of the probes while the turbine is in full operation.

Figure 2:
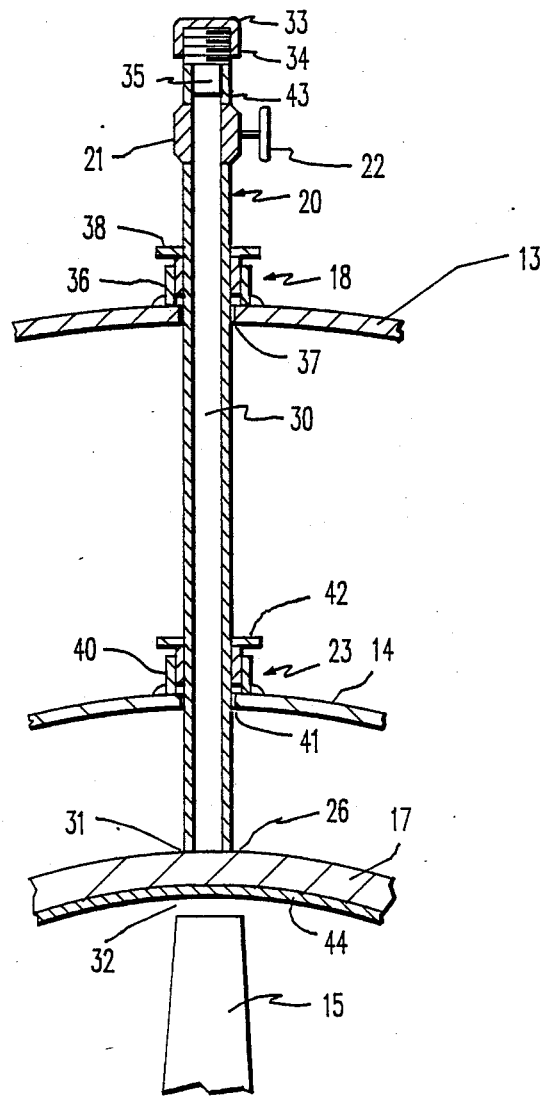
FIG. 2 is a sectional view taken through the probe in the turbine installation of FIG. 1.

Turning now to FIG. 2, a sectional view of a blade vibration monitor probe is illustrated in which the probe mounting assembly 11 is attached through the outer cylinder cover 13 with a packing seal 18 and through the inner cylinder cover 14 with a packing seal 23. The guide tube 20 has a gate valve 21 therein having a handle 22 for opening and closing the gate valve. Guide tube 20 is threadedly attached to the diaphragm support ring 17 in a drilled and tapped opening 26. The probe guide tube 20 passes through the inner cylinder cover 14. Timing probe 30 is inserted in the guide tube 20 and into the drilled opening in the diaphragm support ring 17 adjacent to the turbine blades 15. The dummy probe 30 is held in the tube 20 by a shoulder 31 on the dummy probe 30 abutting against a drilled shoulder 32 in the diaphragm support ring 17 on one end and is held on the other end with a cap 33 threadedly attached to the threads 34 on the tube 20 and has a coil spring 35 to maintain a continuous pressure against the dummy probe 30. The packing seal 18 has an internally threaded packing cylinder 36 welded to the outer cover 13 around the opening 37 and has the guide tube 20 passing therethrough and through a packing screw 38 threaded into the cylinder 36 to pack down a TEFLON cord, or other packing material, to seal against the ingress or egress of gases through the outer cylinder cover 13. Similarly, the seal 23 has a cylinder 40 welded around an opening 41 and has a packing screw 42 threaded into the cylinder 40 to pack down a TEFLON cord or other packing material to seal the inner cover against the ingress or egress of gases. The probe assembly is shown in FIG. 2 with the cap 33 holding the dummy probe 30 in place with its tip position adjacent to the turbine blade 15 and illustrates the position of the probe when the turbine is operating but vibration is not being monitored.

To monitor blade vibration the cap 33 is removed, the dummy probe 30 is removed and replaced with the sensor support tube 25 having a sensor mounted on the end thereof and which is held in position in the guide tube 20 adjacent to the turbine blades 15 for taking readings while the turbine is in operation. Once the desired monitoring has been completed, the sensor support tube 25 and sensor are removed from the guide tube 20 and the dummy probe 30 replaced along with the spring 35 and cap 33. To accomplish this process with the turbine installation in operation requires that the dummy probe 30 be removed until its end portion is just past the gate valve 21 but not removed all the way from the guide tube 20 so as to prevent gas from entering or leaving the guide tube 20. The gate valve 21 is then closed and the dummy probe 30 completely removed from the tube 20. The gate valve 21 then seals off the tube 20 against the ingress or egress of gas into or out of the turbine. The sensor support tube 25 with the sensor mounted on the end is then inserted into the tube 20 upper portion 43 while the gate valve 21 is still closed. A seal for the sensor support tube is mounted on each end portion thereof. The gate valve 21 can then be opened by turning the handle 22. The sensor support tube 25 with a sensor on the end thereof can then be inserted all the way into the tube 20 until its end portion abuts against the shoulder 32 in the same manner as the dummy probe 30 to align the sensor through the diaphragm support ring 17 and the liner 44 in a predetermined position with a predetermined gap 45 between the sensor and the turbine blades 15. The wires for the blade vibration sensor pass through the sensor support tube 25 and out of the tube 20 where they are connected to instrumentation to monitor the readings of the sensor. Once monitoring is complete the process is reversed by sliding the sensor support tube 25 with a sensor mounted thereon from the tube 20 past the gate valve 21 which is then closed before removing the sensor support tube 25 completely from the guide tube 20. The dummy probe 30 can then be partially reinserted, the gate valve opened and the dummy probe inserted all the way in and capped.

Figure 3:
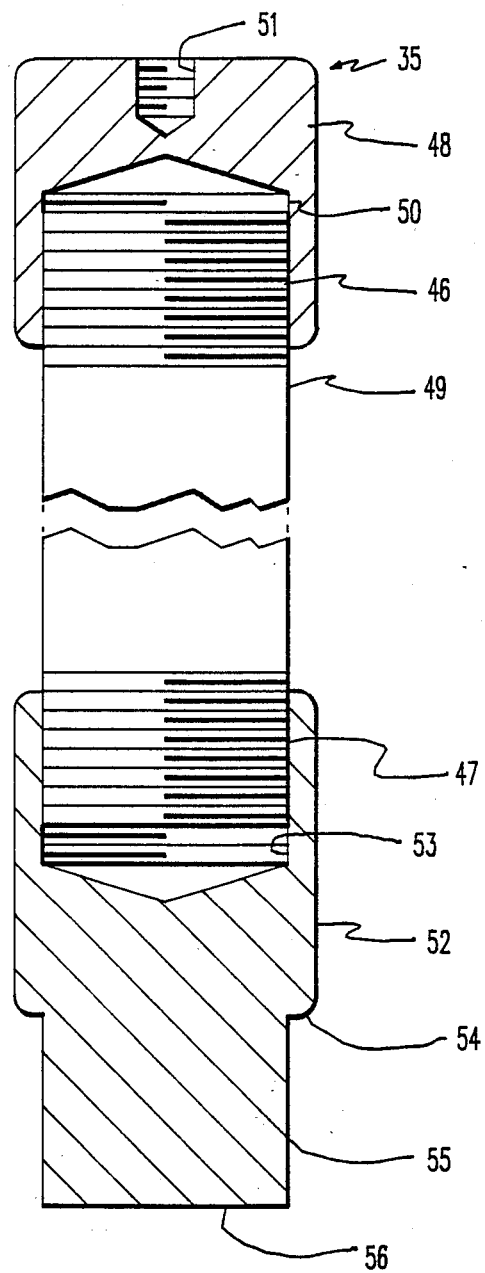
FIG. 3 is a sectional view of a dummy probe.

The dummy probe 30 is more clearly illustrated in connection with the sectional view of a dummy probe in FIG. 3 which has a tube 49 threaded on the top end with threads 46 and on the bottom end with threads 47. The dummy probe has a removal and insertion end 48 having a bore 50 in one end threaded with internal threads to receive the threads 46 for attaching the tube 49. A smaller bore 51 has internal threads which can be used for removing the dummy probe 30 from the tube 20 of FIG. 2. Since the probe is inserted fully into the tube 20, a matching threaded screw or bolt can be threaded into the internal threaded bore 51 to pull the probe 30 from the tube 20 of FIG. 2. A dummy probe tip 52 is provided with an internal bore 53 having internal threads to receive the threaded end 47 of the tube 49. The tip 52 acts as a seal and also has an annular shoulder 54 therearound forming a smaller tip portion 55 with an end 56. Shoulder 54 is precisely positioned to abut against a shoulder 32 to align the dummy probe in the guide tube 20 but spaced from the turbine blades 15.

Figure 4:
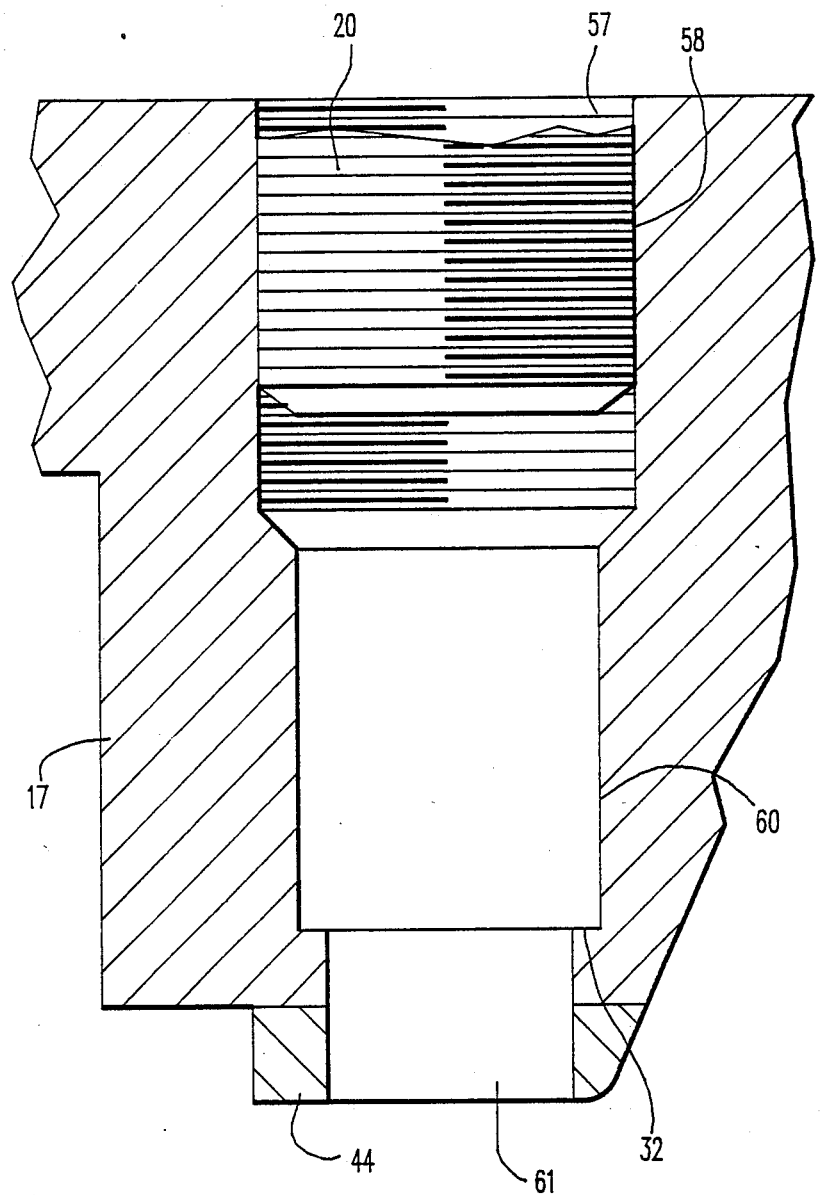
FIG. 4 is a sectional view of the drilled diaphragm ring and liner.

In FIG. 4 the diaphragm support ring 17 having a liner 44 has been drilled and tapped with a bore 57 and threads 58 for threading the end of the guide tube 20 of FIG. 2. A narrower drilled bore 60 has a annular shoulder 32 formed thereon and allows a smaller drilled bore 61 to extend through the liner 44. Thus, either a dummy probe 30 or a sensor probe 25 is inserted through the guide tube 20 to the end portion shown in FIG. 4 and in each case their shoulders abut against the annular shoulder 32 to allow the probe sensor to stick into the opening 61, or in the case of a dummy probe, a portion 55 protrudes thereinto. Shoulder 32 has been precisely drilled to align the sensor tube 25 for taking measurements for determining vibrations in the turbine blades. Thus, alignment merely requires inserting the probe all the way until a shoulder on the inserted tubes abuts the annular shoulder 32. The shoulder provides a positive stop, to prevent the sensor and probe from entering the path of the rotating blades.

Figure 5:
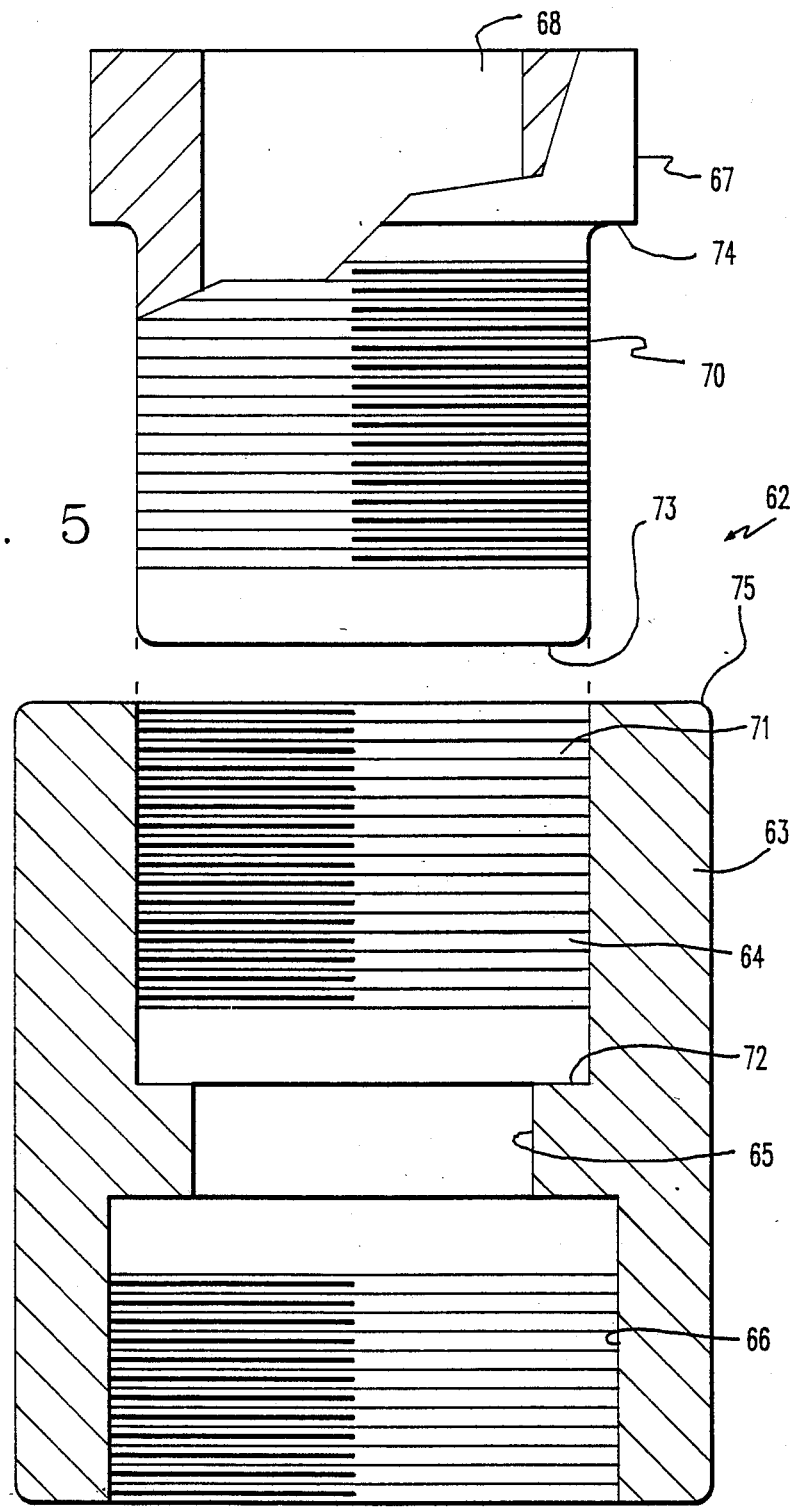
FIG. 5 is a sectional view of a probe seal.

Referring to FIG. 5 a packing seal 62 is illustrated for insertion over the end of the sensor support tube 25 in the end of the tube 20 for sealing and holding the sensor support tube 25 and the guide tube 20. The probe seal member 63 has a drilled and tapped bore 64 in one end thereof with an annular shoulder 65 therein. A drilled and tapped bore 66 is drilled from the other end of the probe seal 63 for threadedly attaching to the end of a hollow sensor support tube 25. A packing screw 67 has a bore 68 drilled therethrough and external threads 70 therearound for threadedly engaging the threads 71 around the bore 64 and is used to pack a TEFLON or other packing material. The threaded packing screw 67 can compress material against the annular shoulder 72 and has the annular end portion 73 inserted thereagainst and can compact a material with the annular ledge 74 against the annular top 75 of the seal 63.

Figure 6:
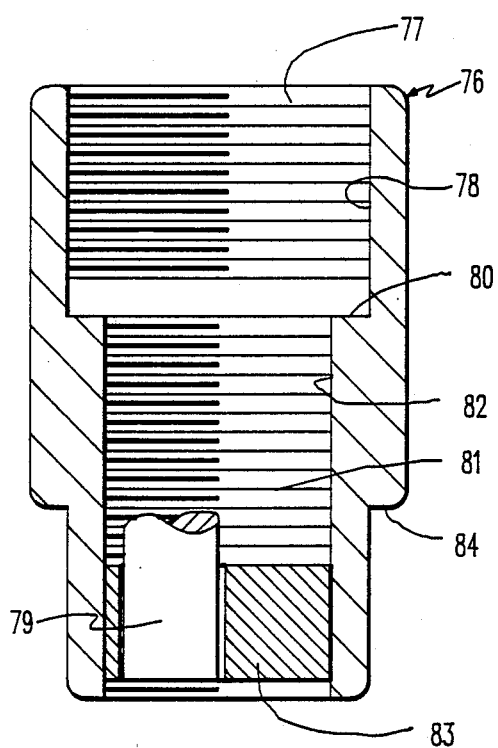
FIG. 6 is a sectional view of an end attachment for a sensor probe.

FIG. 6 illustrates the opposite end attachment for the tube 25 and has a probe tip for the sensor 76 having a bore 77 extending therethrough with a threaded portion 78 for threading into the end of a sensor support tube 25. The annular shoulder 80 blocks the tube from being threaded any further into the probe tip 76. A smaller bore 81 continues on through the probe tip 76 and also has internal threads 82 for threadedly attaching a magnetic sensor thereinto. The sensor will stop just inside the tip 83 of the probe tip 76. The annular shoulder 84 aligns sensor support tube 25 and the sensor mounted in the probe tip 76 in precise alignment by abutting against the annular shoulder 32 in FIG. 2 and 4. The diameter of the tip as well as the diameter of the seal of FIG. 5 match the inside diameter of the guide tube 20 for inserting and removing the sensor on the sensor support tube. A sensor 79 as shown threadedly attached in the threaded bore 81 and is mounted to one side so that rotation of the probe tip 76 will vary the position of the sensor 79 relative to the sensor probe 25 so that rotating sensor probe 25 varies the position of the sensor relative to the turbine blades 15.

It should be clear at this point that a blade vibration monitor has been provided for a turbine installation in which the monitor can be inserted and removed during the operation of the turbine without interfering with the operation of the turbine while preventing the ingress or egress of gases using a fixedly mounted probe tube with a gate valve on one end operating in combination with a dummy probe and a sensor support probe. Each of the two probes and the gate valve keep the guide tube blocked at all times that the turbine is in operation and during the changing of the probes between the dummy probe and the sensor probe. However, the present invention is not to be considered limited to the forms shown which are to be considered illustrative rather than restrictive.

I claim:

1. A method for measuring vibration in turbine blades in which a guide tube is sealedly mounted through the outer and inner cylinder covers of a turbine and extends to a position adjacent the tip of the turbine blades and in which the guide tube is sealed at the cylinder covers and has a gate valve external of said turbine cylinder covers, comprising the steps of:

removing a dummy probe to a location intermediate the gate valve and the external opening of the guide tube while the turbine is in operation, the dummy probe being dimensioned to sealedly engage the interior of the guide tube to prevent escape of fluids from the turbine;

closing the gate valve;

removing the dummy probe completely from the guide tube;

inserting a vibration sensor probe into said guide tube to said location, the sensor probe being dimensioned to sealedly engage the interior of the guide tube to prevent escape of fluids from the turbine;

opening the gate valve;

inserting the sensor probe into the guide tube until a shoulder on the sensor probe rests on a positioning shoulder within the guide tube to permit the sensor probe to be placed adjacent the blades;

measuring vibration in the blades during operation of the turbine, whereby vibration in the blades can be measured during operation of the turbine without interfering with the operation of the turbine by replacing the dummy probe with the sensor probe;

at the completion of said measuring, withdrawing the sensor probe to said location;

closing the gate valve;

removing the sensor probe from the guide tube completely;

re-inserting the dummy probe to said location;

opening the gate valve; and inserting the dummy probe into the guide tube until a shoulder on the dummy probe rests on the positioning shoulder within the guide tube.

2. A method for measuring vibration in the blades in accordance with claim 1 including the step of forming an alignment shoulder in a turbine diaphragm support ring for aligning a sensor probe thereagainst relative to the blades when the sensor probe is inserted until a coating surface of the sensor probe rests against the diaphragm support ring shoulder.

3. A method for measuring vibration in the blades in accordance with claim 2 including the step of locking the dummy probe in position when not measuring vibration by threading a cap over the external opening of the guide tube.

4. A method for measuring vibration in the blades in accordance with claim 3 including the step of placing a spring between the dummy probe and the cap to bias said dummy probe against the alignment shoulder in the diaphragm support ring.

5. A method for measuring vibration in the blades in accordance with claim 4 including the step of selecting a dummy probe having an internal threaded bore on one end thereof for inserting a removal member having external threads on one end for threading into the internal threads of the bore for removing the dummy probe.

6. The combination of a turbine having a rotating shaft with turbine blades extending radially therefrom in a housing and a probe assembly for taking measurements in said turbine comprising:
  a guide tube extending through said housing, said guide tube having an external opening and an internal opening adjacent said blades and defining a passageway therethrough;
  a support ring mounted adjacent said blades and having a guide tube supporting bore therein and a positioning shoulder within said bore;
  sealing means positioned externally of said turbine housing for sealing the passageway through said guide tube;
  a sensor probe shaped to sealedly engage the interior of said guide tube when inserted therein for taking measurements within said turbine while said turbine is in operation, said sensor probe having a first shoulder member formed thereon for abutting said positioning shoulder to prevent said sensor probe from entering the path of the rotating blades; and
  a dummy probe shaped to sealedly engage the interior of said guide tube when inserted therein to fill said guide tube passageway when said sensor probe is removed therefrom to prevent the escape of gas from said turbine, said dummy probe including an elongate shaft having first and second opposing threaded ends, a first end cover for threadedly engaging said first end of said shaft and a second end cover for threadedly engaging said second end of said shaft, said first end cover having a bore therein for receiving a tool for facilitating the removal and insertion of said dummy probe from and into said guide tube and said second end cover having a second shoulder member for abutting said positioning shoulder to prevent said dummy probe from entering the path of the rotating blades.

7. The combination of a turbine having a rotating shaft with turbine blades extending radially therefrom in a housing and a probe assembly for taking measurements occurring in said turbine in accordance with claim 6 in which said sealing means is a gate valve.

8. The combination of a turbine having a rotating shaft with turbine blades extending radially therefrom in a housing and a probe assembly for taking measurements occurring in said turbine in accordance with claim 7 in which said guide tube has a threaded cap fitted over the external opening thereof for sealing said dummy probe in said guide tube.

9. The combination of a turbine having a rotating shaft with turbine blades extending radially therefrom in a housing and a probe assembly for taking measurements occurring in said turbine in accordance with claim 8 in which said guide tube has a spring positioned between said cap and said dummy probe to bias said second end cover of said dummy probe against said positioning shoulder in said bore of said support ring.

10. The combination of a turbine having a rotating shaft with turbine blades extending radially therefrom in a housing and a probe assembly for taking measurements occurring in said turbine in accordance with claim 9 in which said housing has inner and outer cylinder covers and said guide tube is sealedly mounted to said inner and outer covers and to said support ring.

11. The combination of a turbine having a rotating shaft with turbine blades extending radially therefrom in a housing and a probe assembly for taking measurements occurring in said turbine in accordance with claim 6 in which said sensor probe has a sensing member mounted off-center from the axis of said sensor probe whereby rotating said sensor probe varies the position of said sensor relative to the turbine blades.

* * * * *